United States Patent [19]

Dauth et al.

[11] Patent Number: 6,160,149
[45] Date of Patent: Dec. 12, 2000

[54] ORGANOSILICON COMPOUNDS HAVING FLUORESCENT GROUPS, THEIR PREPARATION AND USE

[75] Inventors: Jochen Dauth; Bernward Deubzer, both of Burghausen; Josef Wolferseder, Tann, all of Germany

[73] Assignee: Wacker-Chemie GmbH, Munich, Germany

[21] Appl. No.: 09/150,888

[22] Filed: Sep. 10, 1998

[30] Foreign Application Priority Data

Sep. 11, 1997 [DE] Germany .......................... 197 39 963

[51] Int. Cl.$^7$ .................................. C07F 7/10; C07F 7/08
[52] U.S. Cl. ......................... 556/420; 556/419; 556/440; 522/65; 522/68; 522/74; 522/79
[58] Field of Search ...................... 556/420, 440, 556/419; 522/65, 68, 74, 79

[56] References Cited

U.S. PATENT DOCUMENTS 5,593,787  1/1997  Dauth et al. .

FOREIGN PATENT DOCUMENTS 0 716 114 A1  6/1996  European Pat. Off. .
0 719 835 A1  7/1996  European Pat. Off. .

*Primary Examiner*—Paul F. Shaver
*Attorney, Agent, or Firm*—Brooks & Kushman P.C.

[57] ABSTRACT

The invention describes novel organosilicon compounds having fluorescent groups, containing units of the formula

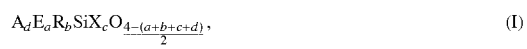

where R is an identical or different, a monovalent, optionally substituted hydrocarbon radical having from 1 to 18 carbon atom(s) per radical, which may be interrupted by one or more oxygen atom(s), X is identical or different, and is a chlorine atom or a radical of the formula $OR^1$, where $R^1$ is a hydrogen atom, or an alkyl radical having from 1 to 8 carbon atom(s) per radical which may be substituted by an ether oxygen atom, E is an organic radical having one or more (meth)acrylate groups, A is a radical of the formula

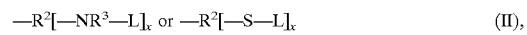

where $R^2$ is a divalent or trivalent, optionally substituted hydrocarbon radical having from 2 to 50 carbon atoms per radical, which is substituted by one or more groups of the formulae

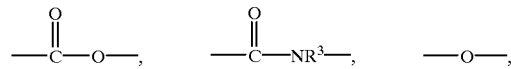

x is 1 or 2, $R^3$ is as defined for $R^1$ or is a radical of the formula $-C(=O)-R^1$, and L is a fluorescent, organic radical, a is 0, 1 or 2, b is 0, 1, 2 or 3, c is 0, 1, 2 or 3, d is 0, 1 or 2 and the sum $a+b+c+d \leq 4$, with the proviso that at least one radical A is present per molecule.

17 Claims, No Drawings

ORGANOSILICON COMPOUNDS HAVING FLUORESCENT GROUPS, THEIR PREPARATION AND USE

TECHNOLOGICAL FIELD

The invention relates to organosilicon compounds having fluorescent groups, to their preparation and use.

BACKGROUND OF THE INVENTION

Organosilicon compounds containing covalently bonded fluorescent groups are widely known in the literature.

Curable organopolysiloxanes containing chromophoric groups, which may also have fluorescent properties, are described in U.S. Pat. No. 3,741,932 (Minnesota Mining and Manufacturing Company, published on Jun. 26, 1973). The synthesis takes place by the ring-opening reaction of epoxy functions with sulfonamide-functional chromophores.

Fluorescent organopolysiloxanes for the treatment of hair are disclosed in U.S. Pat. No. 5,176,906 (Dow Corning Corporation, Jan. 5, 1993). Here, the claimed compounds are prepared via a nucleophilic substitution reaction of amine-functional polysiloxanes with fluorescent compounds having sulfonyl chloride groups.

Radiation-curing epoxy silicone-polyether block copolymers are described in U.S. Pat. No. 5,227,410 (General Electric Company, Jul. 13, 1993). By virtue of the polar structure of the block copolymers, sensitizers in the 200 ppm range can be clearly incorporated.

Organopolysiloxanes containing dansyl groups and curable thermally via a hydrosilylation reaction are described in EP-A 455 384 (Dow Corning Corporation, laid open on Nov. 6, 1991). The organopolysiloxanes containing vinyl and amine functions are modified, for example, using dansyl chloride and can then be cured fully using H-crosslinkers.

Fluorene-group-containing organopolysiloxanes for coatings are disclosed in U.S. Pat. No. 4,978,731 (Minnesota Mining and Manufacturing Company, published on Dec. 18, 1990). The preparation takes place via a hydrosilylation reaction of alkylfluorene with hydrogen-containing organopolysiloxanes. The labeled polysiloxanes serve to determine coating weight and coating defects.

One method of testing the curing performance of the silicones is described in EP-A 720 015 (Avery Dennison Corporation, laid open on Jul. 3, 1996), where polysiloxanes functionalized with pyrene groups enable on-line monitoring of curing.

Silanes containing fluorescent groups and secondary reactions with polyorganosiloxanes as chemical indicators in biological sensors are disclosed in U.S. Pat. No. 4,746,751 (Baxter Travenol Laboratories, published on May 24, 1988). The synthesis is based on a reaction of Grignard compounds with chlorosilanes.

Other organosilicon compounds containing fluorescent groups, especially compounds containing pyrene compounds, are disclosed in U.S. Pat. No. 4,866,152 (Dow Corning Corporation, published on Sep. 12, 1989). By eliminating water from pyrenealdehyde and amino-functional polysiloxanes, it is possible to achieve a covalent bond between the fluorescent agent and the polysiloxane.

Silicone resins having fluorescent properties are described in U.S. Pat. No. 3,427,273 (Owens-Illinois Glass Company, published on Feb. 11, 1969). The preparation involves reaction of bromonaphthalene with a lithium compound and further reaction with alkoxysilanes.

SUMMARY OF THE INVENTION

The object of the present invention is to provide organosilicon compounds containing fluorescent groups, which can be prepared in a simple process using readily available starting materials and without the use of transition metal catalysts, and which can be cured using free-radical polymerization. Another object was to provide organosilicon compounds containing fluorescent groups, which can be used for the preparation of coatings, the labeled organosilicon compounds serving to determine coating weight and to recognize coating defects. These and other objects are achieved by the invention.

DETAILED DESCRIPTION OF THE PREFERRED EMBODIMENTS

The invention provides organosilicon compounds having fluorescent groups, containing units of the formula $$A_d E_a R_b SiX_c O_{\frac{4-(a+b+c+d)}{2}}, \quad (I)$$

where each R may be identical or different, and are monovalent, optionally substituted hydrocarbon radicals having from 1 to 18 carbon atom(s) per radical, which may be interrupted by one or more oxygen atom(s), each X may be identical or different, and is a chlorine atom or a radical of the formula $OR^1$, where $R^1$ is a hydrogen atom, or an alkyl radical having from 1 to 8 carbon atom(s) per radical, which may be substituted by an ether oxygen atom, E is an organic radical having one or more (meth)acrylate groups, A is a radical of the formula $$-R^2[-NR^3-L]_x \text{ or } -R^2[-S-L]_x \quad (II),$$

where $R^2$ is a divalent or trivalent, optionally substituted hydrocarbon radical having from 2 to 50 carbon atoms per radical, which is substituted by one or more groups of the formulae

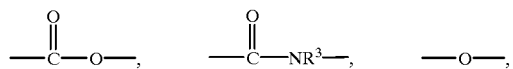

x is 1 or 2, depending on the valency of the radical $R^2$, preferably 2, $R^3$ is as defined for $R^1$ or is a radical of the formula $-C(=O)-R^1$, and L is a fluorescent, organic radical, a is 0, 1 or 2, b is 0, 1, 2 or 3, c is 0, 1, 2 or 3, d is 0, 1 or 2 and the sum $a+b+c+d \leq 4$, preferably the sum of $a+b+c+d \leq 3$, with the proviso that at least one radical A is present per molecule.

The invention also provides a process for the preparation of organosilicon compounds having fluorescent groups, which comprises reacting organosilicon compounds (1) containing units of the formula $$E_aR_bSiX_cO_{\frac{4-(a+b+c)}{2}}, \qquad (III)$$

where R, X, E, a, b and c are as defined above,
with the proviso that at least one radical E is present per molecule, with fluorescent, organic compounds (2) of the formulae $$HNR^3\text{—L or HS—L} \qquad (IV),$$

where
$R^3$ and L are as defined above.

The reaction according to the invention can be carried out without a diluent, in solution, or in the form of emulsion.

The novel organosilicon compounds are preferably silanes or organopolysiloxanes, organopolysiloxanes being preferred.

The novel organosilicon compounds preferably have a mean molecular weight ($M_n$) of from 500 to 1,000,000 g/mol, preferably from 5000 to 500,000 g/mol and preferably a viscosity of from 10 to 1,000,000 mm$^2 \cdot$s$^{-1}$ at 25° C., preferably from 20 to 100,000 mm$^2 \cdot$s$^{-1}$ at 25° C.

Examples of radicals R are alkyl radicals, such as the methyl, ethyl, n-propyl, isopropyl, 1-n-butyl, 2-n-butyl, isobutyl, tert-butyl, n-pentyl, isopentyl, neopentyl, and tert-pentyl radical; hexyl radicals such as the n-hexyl radical; heptyl radicals such as the n-heptyl radical; octyl radicals such as the n-octyl radical, and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl radical and methylcyclohexyl radicals; aryl radicals such as the phenyl, naphthyl, anthryl and phenanthryl radicals; alkaryl radicals such as o-, m-, and p-tolyl radicals, xylyl radicals, and ethylphenyl radicals; and aralkyl radicals such as the benzyl radical and the phenylethyl radical.

Preference is given to the methyl radical, the n-octyl radical, the n-dodecyl radical and the n-octadecyl radical.

Examples of halogenated radicals R are haloalkyl radicals, such as the 3,3,3-trifluoro-n-propyl radical, the 2,2,2,2',2',2'-hexafluoroisopropyl radical, the heptafluoroisopropyl radical and haloaryl radicals, such as the o-, m-, and p-chlorophenyl radicals.

Examples of alkyl radicals $R^1$ are methyl, ethyl, n-propyl, isopropyl, 1-n-butyl, 2-n-butyl, isobutyl, and tert-butyl radicals. Preference is given to the methyl and ethyl radicals. Examples of alkyl radicals $R^1$ which may be substituted by an ether oxygen atom are the methoxyethyl and ethoxyethyl radicals.

$R^3$ is preferably a hydrogen atom.
E is preferably a radical of the formula

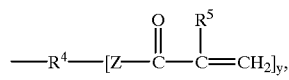

(V)

where
$R^4$ is a divalent or trivalent hydrocarbon radical having from 1 to 50 carbon atom(s), which may be interrupted by one or more oxygen atoms,
Z is a radical of the formula —O— or —NR$^3$—, in particular —O—, where $R^3$ is as defined above, $R^5$ is a hydrogen atom or a methyl group, and
y is 1 or 2, in particular 2.
E is preferably a radical of the formula

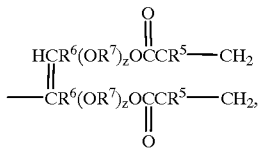

where
$R^5$ is as defined above,
$R^6$ is a linear or branched alkylene radical having from 1 to 6 carbon atom(s) per radical,
$R^7$ is a linear or branched alkylene radical having from 1 to 6 carbon atom(s) per radical and
z is 0 or an integer from 1 to 40.
$R^2$ is preferably a radical of the formula

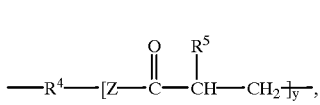

(VI)

where
$R^4$, $R^5$, Z and y are as defined above.
$R^2$ is preferably a radical of the formula

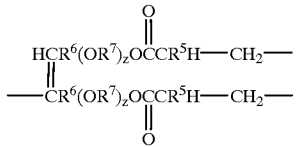

where
$R^5$, $R^6$, $R^7$ and z are as defined above.
Examples of acrylate-functional radicals E are those of the formulae:

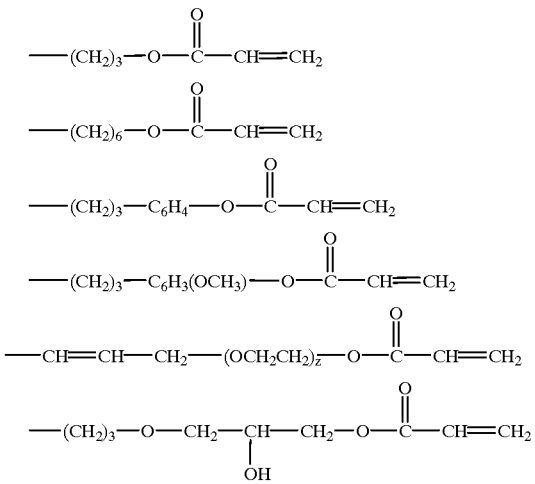

-continued

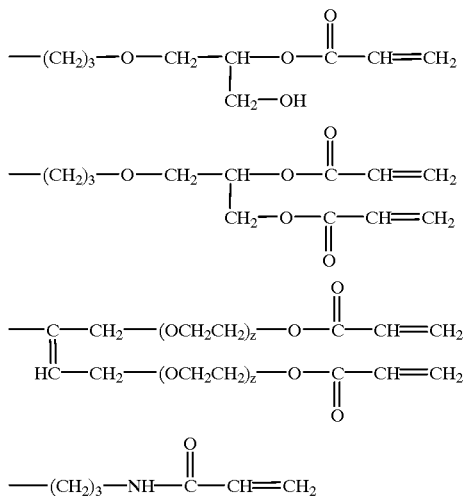

where
z is as defined above.
Examples of radicals A are those of the formulae

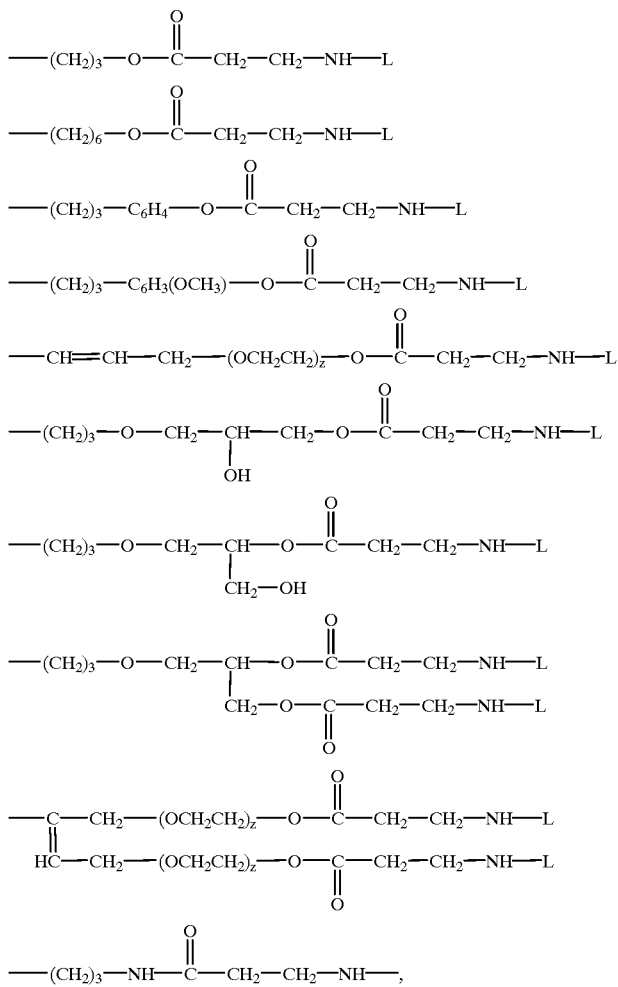

where z and L are as defined above.

A preferred example of the radical A is one of the formula

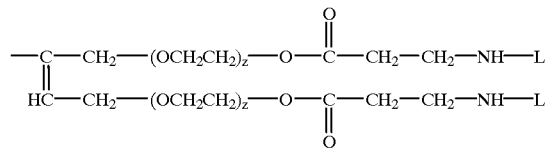

where z and L are as defined above.

L is advantageously a fluorescent hydrocarbon radical having from 4 to 30 carbon atoms per radical, which may contain one or more heteroatoms selected from the group consisting of nitrogen, oxygen, sulfur and phosphorus.

Examples of radicals L are those of the formulae

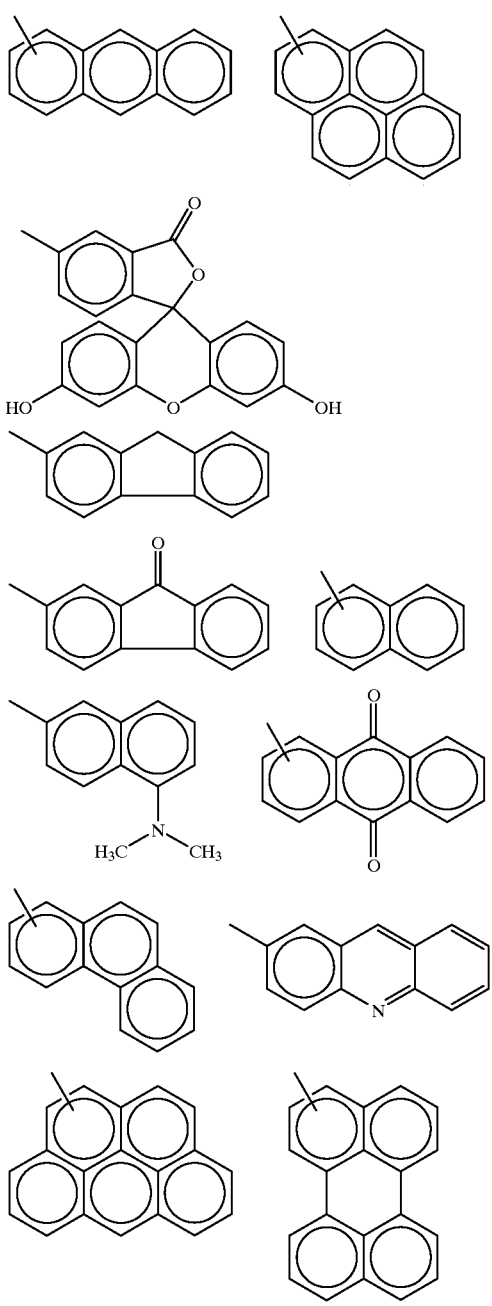

where the bonding to the radical $R^2$ can take place via —$NR^3$— and —S— in any chemically appropriate manner.

Preferred organosilicon compounds having fluorescent groups are those of the formula $$Y_gR_{3-g}SiO(SiR_2O)_o(SiRYO)_mSiR_{3-g}Y_g \qquad (VII),$$

where

R is as defined above, Y is a radical A or E, with the proviso that at least one radical A is present per molecule, g is 0, 1 or 2, m is 0 or an integer from 1 to 1000 and o is 0 or an integer from 1 to 1000.

The organosilicon compounds (1) used in the novel process are advantageously those of the general formula $$E_gR_{3-g}SiO(SiR_2O)_o(SiREO)_mSiR_{3-g}E_g \qquad (VIII),$$

where

R, E, g, o and m are as defined above, with the proviso that at least one radical E is present per molecule.

Processes for the preparation of the organosilicon compounds (1) used in the novel process are known and described, for example, in U.S. Pat. No. 5,593,787 (Wacker-Chemie GmbH, published on Jan. 14, 1997).

The novel process preferably uses, per mole of the radical E of the organosilicon compound (1) used, from 0.0001 to 2 mol, preferably from 0.001 to 2 mol and particularly preferably from 0.001 to 1 mol, of fluorescent organic compound (2).

In the novel process, it is possible to use all known compounds which catalyze Michael-reaction-like reactions, such as, for example, glacial acetic acid, tin(IV) chloride, sodium methoxide and alkali metal amides, which is not preferred.

In addition, in the novel process, it is also possible to add free-radical initiators, such as azo compounds and/or peroxo compounds, as catalysts, which is not preferred. If such catalysts are used, the amounts thereof are preferably from 0.1 to 5% by weight, based on the total weight of the organosilicon compound (1) and the fluorescent organic compound (2).

The novel process may also use solvents and water or mixtures of the two. Examples of organic solvents are toluene, xylene, 2-butanol, 1-butanol, n-butyl acetate, iso-propanol and dimethoxyethane. Organic solvent which is used is preferably removed after the novel reaction.

The novel process is preferably carried out at the pressure of the ambient atmosphere, i.e. at about 1020 hPa (abs.). It can, however, also be carried out at higher or lower pressures. In addition, the novel process is preferably carried out at a temperature of from 25° C. to 150° C., preferably from 25° C. to 120° C., particularly preferably from 25° C. to 100° C.

The organosilicon compounds having fluorescent groups obtained by the novel process can be equilibrated with organopolysiloxanes (3), selected from the group consisting of linear organopolysiloxanes having terminal triorganosiloxy groups, linear organopolysiloxanes having terminal hydroxyl groups, cyclic organopolysiloxanes and mixed polymers of diorganosiloxane and monoorganosiloxane units.

In preferred terms, the linear organopolysiloxanes having terminal triorganosiloxy groups used are those of the formula $$R_3SiO(SiR_2O)_rSiR_3,$$

where

R is as defined above and r is 0 or an integer from 1 to 1500, the linear organopolysiloxanes having terminal hydroxyl groups are preferably those of the formula $$HO(SiR_2O)_sH,$$

where

R is as defined above and s is an integer from 1 to 1500, the cyclic organopolysiloxanes are preferably those of the formula $$(R_2SiO)_t$$

where

R is as defined above and t is an integer from 3 to 12 and the mixed copolymers are preferably those having units of the formula $$R_2SiO \text{ and } RSiO_{3/2},$$

where

R is as defined above.

The quantity ratios of the organopolysiloxanes (3) used in the optional equilibration and organopolysilicon compounds having fluorescent groups, are determined merely by the desired content of the fluorescent groups in the organopolysiloxanes produced in the optional equilibration, and by the desired mean chain length. This equilibration may use acidic or basic catalysts which promote the equilibration.

Examples of acidic catalysts are sulfuric acid, phosphoric acid, trifluoromethanesulfonic acid, phosphonitrilic chlorides, and acidic catalysts which are solid under the reaction conditions, such as acid-activated bleaching earth, acidic zeolites, sulfonated charcoal and sulfonated styrene-divinylbenzene copolymers. Preference is given to phosphonitrilic chlorides. Phosphonitrilic chlorides are preferably used in amounts of from 5 to 1000 ppm by weight (=parts per million), in particular from 50 to 200 ppm by weight, in each case based on the total weight of the organosilicon compounds used.

Examples of basic catalysts are benzyltrimethylammonium hydroxide, tetramethylammonium hydroxide, alkali metal hydroxides, alkaline earth metal hydroxides in methanolic solution, phosphonium hydroxides and silanolates. Preference is given to alkali metal hydroxides, which are used in amounts of from 50 to 10,000 ppm by weight (parts per million), in particular from 500 to 2000 ppm by weight, in each case based on the total weight of the organosilicon compounds used.

The equilibration, which is optionally carried out, is preferably carried out at from 80 to 150° C. and at the pressure of the ambient atmosphere, i.e. at about 1020 hPa (abs.). If desired, it is, however, also possible to use higher or lower pressures. The equilibration is preferably carried out in from 5 to 20 percent by weight, based on the total weight of the organosilicon compounds used in each case, of a water-immiscible solvent, such as toluene.

Prior to working-up the mixture obtained in the equilibration, the catalyst can be rendered inactive.

The novel process can be carried out batchwise, semicontinuously or completely continuously.

If the fluorescent, organic compound (2) is used in substoichiometric amounts relative to the (meth)acrylate groups in organosilicon compound (1), the novel organosilicon compounds may be crosslinked via the remaining (meth) acrylate groups by free-radical means or via a hydrosilylation.

The novel organosilicon compounds having fluorescent groups and (meth)acryloxy groups then preferably comprise, on average, at least 0.001 radicals A and at least 2 radicals E, in particular, on average, from 0.01 to 0.1 radicals A and from 2 to 8 radicals E.

The invention also provides radiation-curing compositions comprising (A) organopolysiloxanes having fluorescent groups and (meth)acryloxy groups, containing units of the formula (1), and (B) photosensitizers. The invention also provides moldings prepared by crosslinking the novel compositions.

The novel radiation-curing compositions are preferably used for the preparation of coatings. The invention further provides a process for the preparation of coatings, which comprises depositing the novel composition onto the substrate and irradiating with high-energy radiation to crosslink the composition.

The novel organopolysiloxanes having fluorescent groups and (meth)acryloxy groups are preferably crosslinked using light, preferably using ultraviolet light having wavelengths in the range from 200 to 400 nm. The ultraviolet light can be generated, for example, in xenon, low-pressure, medium-pressure, or high-pressure mercury vapor lamps, or excimer lamps. For crosslinking using light, that having a wavelength of from 400 to 600 nm, i.e. "halogen light", is also suitable.

The energy sources suitable for crosslinking the novel organopolysiloxanes can, however, also be X-rays, gamma-rays or electron beams or the simultaneous use of at least two different types of such rays and/or energy sources. In addition to the high-energy radiation, the input of heat, including the input of heat using infrared light, can be used. Such an input of heat is, however, in no way necessary and is preferably omitted in order to reduce energy costs.

Suitable photosensitizers (B) are well known in the art, and include optionally substituted acetophenones, propiophenones, benzophenones, anthraquinones, benzils, carbazoles, xanthones, thioxanthones, fluorenes, fluorenones, benzoins, naphthalenesulfonic acids, benzaldehydes and cinnamic acids.

Examples thereof are fluorenone, fluorene, carbazole; acetophenone; substituted acetophenones such as 3-methylacetophenone, 2,2'-dimethoxy-2-phenylacetophenone, 4-methylacetophenone, 3-bromoacetophenone, 4-allylacetophenone, p-diacetylbenzene, and p-tert-butyltrichloroacetophenone; propiophenone; substituted propiophenones such as 1-[4-(methylthio)phenyl]-2-morpholine-1-propanone; benzophenone; substituted benzophenones such as Michler's ketone, 3-methoxybenzophenone, 4,4'-dimethylaminobenzophenone, 4-methoxybenzophenone, 4chlorobenzophenone, 4,4'-dimethoxybenzophenone, and 4-chloro-4'-benzylbenzophenone; xanthone; substituted xanthones such as 3-chloroxanthone, 3,9-dichloroxanthone, 3-chloro-8-nonylxanthone; thioxanthone; substituted thioxanthones, such as isopropylthioxanthone; anthraquinone; substituted anthraquinones such as chloro-anthraquinone and anthraquino-1,5-disulfonic acid disodium salt; benzoin; substituted benzoins such as benzoin methyl ether, benzil; 2-naphthalenesulfonyl chloride; benzaldehyde; and cinnamic acid. Particular preference is given to oligo[2-hydroxy-2-methyl-1-(4-(1-methylvinyl)phenyl)-propanone].

Photosensitizers are used in the novel compositions preferably in amounts of from 0.01 to 10% by weight, preferably from 0.5 to 5% by weight, in each case based on the total weight of the organopolysiloxanes to be crosslinked.

The novel compositions can comprise polymerization inhibitors. In order to facilitate handling, it is preferable to add small amounts of inhibitors to the novel compositions in order, for example, to prevent premature crosslinking of a usable formulation during its storage.

Examples of inhibitors which may be used are all customary inhibitors which have also been used hitherto in processes which proceed by means of free-radicals, such as hydroquinone, 4-methoxyphenol, 2,6-di-tert-butyl4-methylphenol or phenothiazine. Inhibitors are preferably used in amounts of from 10 to 10,000 ppm, particularly preferably from 50 to 1000 ppm, in each case based on the total weight of the organopolysiloxanes to be crosslinked.

If desired, it is additionally possible to add monomeric or oligomeric, organic (meth)acrylate esters or their mixtures in an amount of, preferably, from 0.1 to 10% by weight, based on the total weight of the organopolysiloxanes to be crosslinked, although this is not preferred.

Examples of substrates to which the novel coatings can be applied are those of paper, wood, cork, polymer films, for example polyethylene films or polypropylene films, ceramic articles, glass, including glass fibers, metals, boards, including those made of asbestos, and surfaces of woven and nonwoven cloth made from natural or synthetic, organic fibers. The novel coatings find application, for example, in the coating of release paper.

The novel radiation-curing compositions can be applied to the substrates to be coated by any of the widely known methods suitable for producing coatings from liquid materials, for example by dipping, spreading, flow coating, spraying, rolling, printing, for example using an offset gravure coating device, or knife or blade coating.

The novel organosilicon compounds having fluorescent groups are notable for their simple method of preparation and the possibility of targeted gradation of the luminescence.

In contrast to hydrosilylation reactions, the Michael-type reaction does not require a transition metal for catalysis. As a result of the low reaction temperatures, the additional thermal stress of the (meth)acrylate groups in the reaction is low. The fluorescent groups can be provided "in situ" during the synthesis of the silicon acrylates.

If, in the novel process, compounds (2) of the formula $HNR^3$—L are used, secondary and tertiary amines are formed after the reaction, which can react as redox partners in the free-radical polymerization, and can reduce the sensitivity to oxygen of the free radical polymerization. The novel organosilicon compounds are preferably used in the radiation-curing of silicone acrylates, in which case they do not have an inhibiting effect. Using a calibration method, it is thus possible to determine the application weights of the coatings by means of luminescence measurements.

Defective coatings can be recognized easily. The novel organosilicon compounds having fluorescent groups can also be used as an additive in organopolysiloxane compositions which are thermally addition-crosslinking.

EXAMPLE 1

35 mg (0.18 mmol) of 1-aminoanthracene are dissolved in 1 g (10.9 mmol) of toluene at room temperature, and then 70 g (58 mmol C═C) of a dimethylpolysiloxane of mean chain length 56 having terminal Si-bonded diacrylate groups of the formula

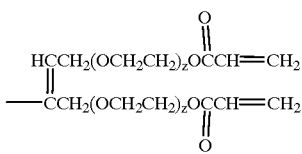

$z=2.7–3.0$ which has a double bond equivalent of about 1300 g/mol and a viscosity of 270 mm$^2$/s at 25° C. are then added. The reaction solution is heated to 90° C. and stirred for 1 hour. Following filtration, the reaction mixture is evaporated under a high vacuum (1 mbar) at 90° C. to a constant weight. 68.3 g (97.6% of theory) of a yellow, clear oil having a viscosity of 302 mm$_2$/s at 25° C. are obtained. The oil exhibits a strong fluorescence in the UV range of 340–410 nm (fluorescent polymer 1).

EXAMPLE 2

The procedure of Example 1 is repeated but using 70 mg (0.36 mmol) instead of 35 mg of 1-aminoanthracene. 67.9 g (97% of theory) of a brownish, clear oil having a viscosity of 308 mm$^2$/s at 25° C. are obtained. The oil exhibits a strong fluorescence in the UV range of 340–410 nm.

EXAMPLE 3

The procedure of Example 1 is repeated but using 35 mg (0.1 mmol) of 4-aminofluorescein instead of 35 mg of 1-aminoanthracene, and 5 g (67.6 mmol) of 2-butanol instead of 1 g of toluene. 69.1 g (98.7% of theory) of an orange-colored, clear oil having a viscosity of 321 mm$^2$/s at 25° C. are obtained. The oil exhibits a strong fluorescence in the UV range of 410–550 nm (fluorescent polymer 2).

EXAMPLE 4

The procedure of Example 1 is repeated but using 70 mg (0.32 mmol) of 4-aminopyrene instead of 35 mg of 1-aminoanthracene, and 2 g instead of 1 g of toluene. 67.3 g (96.1% of theory) of a brownish oil having a viscosity of 298 mm$^2$/s at 25° C. are obtained. The oil exhibits a strong fluorescence in the UV range of 310–425 nm.

EXAMPLE 5

35 mg (0.18 mmol) of 1-aminoanthracene are dissolved in 1 g (10.9 mmol) of toluene at room temperature, and then 70 g (146 mmol C═C) of a dimethylpolysiloxane of average chain length 15 having terminal Si-bonded diacrylate groups of the formula as in Example 1, which has a double bond equivalent of about 500 g/mol and a viscosity of 110 mm$^2$/s at 25° C., are added. The reaction solution is heated to 90° C. and stirred for 1 hour. Following filtration, the reaction mixture is evaporated under a high vacuum (1 mbar) at 90° C. to a constant weight. 68.4 g (97.7% of theory) of a brown, clear oil having a viscosity of 165 mm$^2$/s at 25° C. are obtained. The oil exhibits a strong fluorescence in the UV range of 310–425 nm (fluorescent polymer 3).

EXAMPLE 6

3% by weight of 2-hydroxy-2-methyl-1-phenylpropan-1-one (Darocur® 1173 from Ciba-Geigy) are added to fluorescent polymer 1, the preparation of which is described in Example 1. The formulation is applied to a polypropylene film from UCB, which has been corona-pretreated, in a layer thickness of about 3 μm using a glass rod, and cured for 3 seconds at 30° C. in a nitrogen atmosphere containing 20 ppm of residual oxygen under a 300 series Hg lamp from Fusion. A smear-free and abrasion-resistant silicone coating is obtained.

If, after curing, the siliconized PP film is observed under a "Fluotest" UV hand lamp from Hanau having an emission maximum at 254 nm, as a result of the fluoresence of the silicone layer which can be seen with the naked eye, very small coating defects or differences in layer thicknesses can be detected.

EXAMPLE 7

Fluorescent polymer 2, the preparation of which is described in Example 3, is formulated and cured as described in Example 6 to give a smear-free and abrasion-resistant silicone coating.

If, after curing, the siliconized PP film is observed under a "Fluotest" UV hand lamp from Hanau having an emission maximum at 366 nm, an optimum readily detectable fluorescence is also evident here, which ensures coating control.

EXAMPLE 8

3% by weight of oligo-[2-hydroxy-2-methyl-1-(4-(1-methylvinyl)phenyl)propanone], available commercially under the trade name Esacure KIP 150 from Lamberti are added to fluorescent polymer 3, the preparation of which is described in Example 5. The formulation is applied to a polyester film from ICI in a layer thickness of about 3 μm using a glass rod, and cured as described in Example 6 to give a smear-free and abrasion-resistant silicone coating.

If the siliconized polyester film is observed under a UV hand lamp having an emission maximum at 254 nm as in Example 6, a strong fluorescence of the silicone layer is readily perceptible.

What is claimed is:

1. An organosilicon compound having fluorescent groups, containing units of the formula

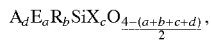

where
R is identical or different, and is a monovalent, optionally substituted hydrocarbon radical having from 1 to 18 carbon atom(s) per radical, which may be interrupted by one or more oxygen atom(s),
X is identical or different, and is a chlorine atom or a radical of the formula $OR^1$,
where
$R^1$ is a hydrogen atom, or an alkyl radical having from 1 to 8 carbon atom(s) per radical, which may be substituted by an ether oxygen atom,
E is an organic radical having one or more (meth)acrylate groups,
A is a radical of the formula $$-R^2[NR^3-L]_x \text{ or } -R^2[-S-L]_x \quad (II),$$

where
$R^2$ is a divalent or trivalent, optionally substituted hydrocarbon radical having from 2 to 50 carbon atoms per radical, which is substituted by one or more groups of the formulae

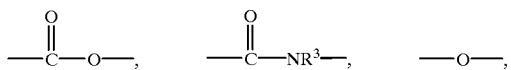

x is 1 or 2, depending on the valency of the radical $R^2$,
$R^3$ is as defined for $R^1$ or is a radical of the formula $-C(=O)-R^1$, and
L is a fluorescent, organic radical,
a is 0, 1 or 2,
b is 0, 1, 2 or 3,
c is 0, 1, 2 or 3,
d is 0, 1 or 2
and the sum a+b+c+d≦4,
with the proviso that at least one radical A is present per molecule.

2. The organosilicon compound as claimed in claim 1, wherein E is a radical of the formula

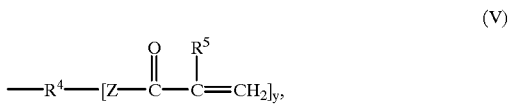

where
$R^4$ is a divalent or trivalent hydrocarbon radical having from 1 to 50 carbon atom(s), which may be interrupted by one or more oxygen atoms,
Z is a radical of the formula —O— or —$NR^3$—, where $R^3$ is as defined in claim 1,
$R^5$ is a hydrogen atom or a methyl group, and
y is 1 or 2.

3. The organosilicon compound as claimed in claim 1, wherein $R^2$ is a radical of the formula

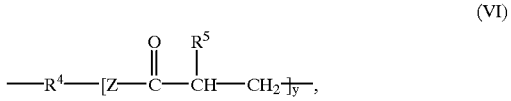

where
$R^4$ is a divalent or trivalent hydrocarbon radical having from 1 to 50 carbon atom(s), which may be interrupted by one or more oxygen atoms,
Z is a radical of the formula —O— or —$NR^3$—, where $R^3$ is as defined in claim 1,
$R^5$ is a hydrogen atom or a methyl group, and
y is 1 or 2.

4. The organosilicon compound as claimed in claim 2, wherein $R^2$ is a radical of the formula

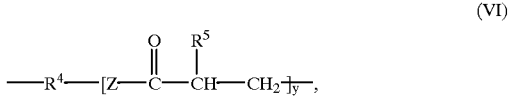

where
$R^4$ is a divalent or trivalent hydrocarbon radical having from 1 to 50 carbon atom(s), which may be interrupted by one or more oxygen atoms,
Z is a radical of the formula —O— or —$NR^3$—, where $R^3$ is as defined in claim 1, $R^5$ is a hydrogen atom or a methyl group, and y is 1 or 2.

5. The organosilicon compound of claim 1 wherein x is 2.

6. A process for the preparation of organosilicon compounds having fluorescent groups, which comprises reacting organosilicon compounds (1) containing units of the formula $$E_a R_b SiX_c O_{\frac{4-(a+b+c)}{2}}, \qquad (III)$$

where

R is identical or different, and is a monovalent, optionally substituted hydrocarbon radical having from 1 to 18 carbon atom(s) per radical, which may be interrupted by one or more oxygen atom(s), X is identical or different, and is a chlorine atom or a radical of the formula $OR^1$, where $R^1$ is a hydrogen atom, or an alkyl radical having from 1 to 8 carbon atom(s) per radical, which may be substituted by an ether oxygen atom, E is an organic radical having one or more (meth)acrylate groups, a is 0, 1 or 2, b is 0, 1, 2 or 3, c is 0, 1, 2 or 3, with the proviso that at least one radical E is present per molecule, with fluorescent, organic compounds (2) of the formulae $$HNR^3\text{—}L \text{ or } HS\text{—}L \qquad (IV),$$

where $R^3$ is as defined for $R^1$ or is a radical of the formula —C(=O)—$R^1$, and L is a fluorescent, organic radical.

7. The process as claimed in claim 6, wherein the organosilicon compound (1) used is one of the general formula $$E_g R_{3-g} SiO(SiR_2 O)_o (SiREO)_m SiR_{3-g} E_g \qquad (VIII),$$

where

R and E are as defined in claim 6, g is 0, 1 or 2, m is 0 or an integer from 1 to 1000 and o is 0 or an integer from 1 to 1000, with the proviso that at least one radical E is present per molecule.

8. A radiation-curing composition comprising (A) organosilicon compounds having fluorescent groups and (meth)acrylate groups as claimed in claim 1, and (B) photosensitizers.

9. A radiation-curing composition comprising (A) organosilicon compounds having fluorescent groups and (meth)acrylate groups as claimed in claim 2, and (B) photosensitizers.

10. A radiation-curing composition comprising (A) organosilicon compounds having fluorescent groups and (meth)acrylate groups as claimed in claim 3, and (B) photosensitizers.

11. A radiation-curing composition comprising (A) organosilicon compounds having fluorescent groups and (meth)acrylate groups as claimed in claim 4, and (B) photosensitizers.

12. A radiation-curing composition comprising (A) organosilicon compounds having fluorescent groups and (meth)acrylate groups prepared by the process of claim 6, and (B) photosensitizers.

13. A radiation-curing composition comprising (A) organosilicon compounds having fluorescent groups and (meth)acrylate groups prepared by the process of claim 7, and (B) photosensitizers.

14. A molding prepared by crosslinking the compositions as claimed in claim 8.

15. The molding as claimed in claim 14 which is a coating.

16. A process for the preparation of a coating which comprises depositing the composition as claimed in claim 8 onto a substrate to form a coated substrate and irradiating said coated substrate with high-energy radiation to crosslink said coating.

17. The organosilicon compound of claim 1 wherein x is 2.

* * * * *